UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 595,355, dated December 14, 1897.

Application filed May 11, 1892. Serial No. 432,597. (No specimens.)

*To all whom it may concern:*

Be it known that I, JOHN H. STEVENS, of the city of Newark, in the county of Essex and State of New Jersey, have invented certain new and useful Improvements in the Manufacture of Compounds of Pyroxylin or Nitrocellulose, of which improvements the following is a specification.

My improvements are applicable to the manufacture of the entire class of materials which are well known in trade as "pyroxylin compounds;" and the distinctive novelty of my invention is the employment, in combination with pyroxylin, of certain substances which I have discovered to possess the property of dissolving or of aiding the conversion of the pyroxylin into a condition suitable for applications in commerce or the arts. I am enabled thus to form a new composition of matter possessing practical utility, and the employment of my new combinations in the various manipulations to which I subject them constitutes a decided improvement in this art. The fact that the new combinations and relations into which my ingredients are brought are susceptible of application in all of the well-known processes of this manufacture and require no important alteration of methods also constitutes a very useful and practical feature of my invention.

It is well understood now that the pyroxylin used in making compounds such as those to which I refer is of the soluble variety—in other words, is soluble in various liquids called "solvents of nitrocellulose"—such, for instance, as wood-alcohol, acetate of amyl, strong spirits of camphor, and a mixture of ether and alcohol.

The methods of producing pyroxylin by the action of nitric and sulfuric acids on some form of cellulose, such as cotton or paper, and the varying characteristics or degrees of solubility even in soluble pyroxylin, depending upon the conditions surrounding its manufacture, are too well known to require description. Soluble pyroxylin suitable for the purposes of this manufacture can be made by any well-instructed chemist or procured commercially from numerous manufacturers and dealers.

The many English and United States patents which have been issued for improvements in the class to which my present invention appertains render unnecessary any description of the different methods for making pyroxylin compounds or their great variety and extended application. Such patents, as well as the recognized state of the art, disclose the fact that pyroxylin compounds consist of pyroxylin compounded with solvents, coloring-matters, or other materials, and that the solidity or softness or degree of fluidity of the compound depends upon the solubility of the pyroxylin and the proportion of the solvents or other ingredients employed. They also show, what is generally well known, that the most important compounds are those made with just sufficient solvent to convert the pyroxylin by the aid of heat and masticating operations, with subsequent solidification and manipulation in machinery designed to form the solid compound into various shapes convenient for further manipulation or application in the arts. Further, they show that a less extensive but still very important application of pyroxylin compounds is in the form of solutions of a fluid, semifluid, or pasty nature, consisting of pyroxylin dissolved in sufficient liquid solvents to produce a compound of the desired consistency.

Examples of the solid compounds are seen in commerce as imitations of natural and other substances and representing tortoise-shell, ivory, amber, coral, carnelian, malachite, lapis lazuli, horn, leather, linen, &c. These have for many years been made into various useful forms, such as combs, brush and mirror backs, eyeglass-frames, piano-keys, business-cards, fancy articles, boxes, jewelry, pipe-bits, stereotypes, picture-frames, pocket-books, collars and cuffs, billiard-balls, cutlery-handles, photographic negatives and positives, &c.

The semifluid compounds have been used for spreading upon surfaces—as cloth, paper, and glass—for the purpose of applying a waterproof coating or a coating which when dry could be stripped off and used as a sheet or film. Lithographs, prints, cloth for clothing, and numerous articles have been protected or waterproofed in this way.

The pasty compounds have been used for rolling or spreading on fabrics or for covering cores or other objects by means of pressure—billiard-balls, for instance—as well as for other uses.

The fluid compounds are represented by the thin pyroxylin solutions employed as collodion in photography or the varnishes and lacquers used for coating pictures, signs, printed paper, wood, metals, hat-bodies, and other articles, &c., or as cements to unite the solid compounds to each other or to paper, cloth, &c. Billiard-balls and other articles have also been supplied with a substantial coating by repeated dippings in the fluid compounds, and the hard thick protective sheet has been turned in a lathe and polished, so as to form an imitation of an ivory billiard-ball.

The experience of the art has demonstrated that in all of these applications the nature of the solvent employed has largely determined the character of the result, and many of the patents referred to have been confined to improving this manufacture by the use of new solvents.

I have spent a number of years in this line of investigation, and my experiments have resulted in the discovery and application of many new solvents of pyroxylin, some of which are described in United States Patents Nos. 269,340 to 269,345, inclusive; and by reason of such discoveries I have improved this manufacture to an extraordinary degree, for my solvents possess properties very essential to these applications and of such varying nature that my inventions have given a strong impetus to all branches of this art, compounds of every description from solid mixtures to very fluid solutions having been made in enormous quantities in working under these patents.

It is the object of this present invention to still further extend the list of substances which can be employed to dissolve or convert pyroxylin or form with it useful combinations, and it is based upon a series of experiments in which I have demonstrated that certain liquid members of the fatty-acid group of "ketones" are useful solvents of pyroxylin and can be employed in various ways, some of which are hereinafter described, in the manufacture of pyroxylin compounds for practical use.

It has been known for many years that acetone is an active solvent of pyroxylin; but, although it is a powerful solvent, in the cold, of practically all forms of soluble pyroxylin, it has not generally been considered as a useful solvent in itself nor when employed as the only solvent in a pyroxylin compound, and its practical utility as a solvent has been confined to its employment in combination with other solvents. The different members of the group of solvent substances the employment of which is the subject of the present invention are quite distinct from such solvents as acetone in that they are of practical utility when used alone with pyroxylin and form therewith compounds possessing valuable properties in such applications as are demanded by commerce and the arts.

The following list represents the prominent members of the present group of solvents. They are all what are known in chemistry as "ketones" derived from fatty acids, corresponding to the monohydric alcohols:

Simple ketones: propion, (diethyl ketone,) butyron, (dipropyl ketone,) valeron, (dibutyl ketone,) and capron, (dipentyl ketone.)

Compound ketones: methyl-ethyl ketone, methyl-propyl ketone, methyl-butyl ketone, methyl-pentyl ketone, methyl-hexyl ketone, ethyl-propyl ketone, ethyl-butyl ketone, ethyl-pentyl ketone, ethyl-hexyl ketone, propyl-butyl ketone, propyl-pentyl ketone, propyl-hexyl ketone, and butyl-pentyl ketone.

These substances are all active solvents of pyroxylin at the ordinary temperature, by which I mean the ordinary temperature of the factory or work-room—say 70° to 75° Fahrenheit—or, in other words, they are active solvents in the cold. There is, however, a variation in the degree of activity among the various members of the group. As a rule the more volatile ketones, or those having the lowest boiling-points, not only dissolve pyroxylin with the greatest rapidity, but will even dissolve pyroxylin which is generally considered rather stubborn in its resistance to the action of the solvent, requiring powerful solvents, such as strong wood-alcohol, for its solution. The less volatile members, or those which possess the highest boiling-points, are more limited in activity as solvents and require, as a rule, pyroxylin of easy solubility. I would recommend, therefore, in operating with these solvents that the pyroxylin be what is generally termed "easily soluble"—that is, easily attacked by solvents. The usefulness of these ketone solvents is not, however, confined to any particular form of soluble pyroxylin, because their capacity for acting in combination with each other and also with other solvents and their susceptibility to the stimulating influences of heat, all of which is hereinafter described, permits their employment in such a way as to give to the final product of their combination with pyroxylin such peculiar characteristics as are imparted to the compound by the solvent employed.

The well-informed chemist will recognize that this list of ketones does not embrace all of the liquid ketones derived from the fatty acids corresponding to the monohydric alcohols. What I wish to comprise in this list are the ketones lying between the limits of the extremes exhibited by the examples given. Thus in regard to the simple ketones I include all the ketones which, according to well-understood chemical laws and as plainly described in chemical publications, lie within and include the limits expressed by propion as the one extreme and capron as the other extreme, propion being the more volatile and capron the least volatile. As to the compound ketones I wish to include in the methyl group every ketone between and including methyl-ethyl ketone and methyl-hexyl ketone. In the ethyl group the extremes are ethyl-propyl ketone and ethyl-hexyl ketone. In the the propyl group the extremes are propyl-butyl ketone and propyl-hexyl ketone. In the butyl group I have found the highest useful member to be butyl-pentyl ketone. Obviously to avoid repetition I have in the above enumeration avoided mentioning the actual extremes when such had already been included in another group. Thus in the propyl group I mentioned propyl-butyl ketone as the lowest member, whereas in reality propyl-methyl ketone would be the lowest member; but this has already been given under the name "methyl-propyl ketone," which is identical with propyl-methyl ketone. It will be recognized that I have excluded certain ketones which chemically belong to the same group. These, however, I have purposely left out, as my investigations have shown them to be not practically useful. The group which is the subject of the present invention does not, therefore, include the entire group as recognized by chemistry, but only members of the ketone series which lie within certain bounds or limits of the complete group as recognized in chemistry. Anything lying between these extremes possesses, as my experiments show, the necessary characteristics for forming useful pyroxylin solvents.

Possessed of a knowledge of the state of the art and the volatile properties of the ketones embraced in the present group of solvents and guided by my instructions as disclosed in this specification, the experienced operator will have no difficulty in manufacturing pyroxylin compounds with this new group of solvents. In regard to the use of the members of this group alone as solvents in the compound I would state that if but one ketone be used as a solvent it is preferable for ordinary purposes to select it from those of light or medium volatility, because unless some specially-slow-drying effect is desired it takes too long for the less volatile ketones to evaporate from the compound.

In making solid compounds, where only sufficient solvent is used to form a stiff mass suitable for mastication in rolls, I have found that the employment of such ketones as methyl-ethyl ketone, methyl-propyl ketone, and diethyl ketone produce good results, though, of course, the less volatile ketones can be used alone to form an extremely-slow-drying compound, as before stated, when such is desired.

The proper thing to do when operating with ketones as the only solvents is to use just sufficient of the heavier ketones to leave in the final product a residue which will give the compound the property of susceptibility to molding operations under heat and have the balance of the liquid solvent consist of one or more of the lighter or more volatile ketones, which would readily pass off, so as to easily bring the compound to a hardened condition.

In making the more liquid compounds, such as the spreading solutions or varnishes, with single members of this group of solvents I find it best to employ the more volatile substances, as the heavier members have a tendency to form thick solutions and require a very carefully-selected easily-soluble pyroxylin. When used alone in liquid solutions, the less volatile ketones form such solutions as would be required for spreading on surfaces to make extremely-slow-drying products. As with the solid compounds, the best results are obtained by a mixture of the different members of the group in cases where only the ketones are wanted as solvents, in which cases the union of one possessing easy volatility with one of the heavier ketones can be made to yield a great variety of effects. For instance, a mixture of methyl-ethyl and propyl-hexyl ketones in which pyroxylin has been dissolved gives a hard transparent film when spread upon glass and dried.

What is really valuable in the art is a solvent which can be used not only by itself, but in combination with other solvents, because the most useful effects are produced by the mixture of different solvent substances, as is well understood. In this connection the present group of solvents furnishes an exceedingly valuable contribution to the list of solvent substances, for they meet that demand for solvents which impart to compounds made with them peculiar properties, and not necessarily when used alone, but also when largely diluted with other substances—like wood-alcohol or grain-alcohol, for instance. In order to get the best results, it is desirable that the operator should be informed as to the peculiar behavior of these ketones when combined with well-known solvent substances. When mixed with alcohol, (by which I mean grain-alcohol or ethylic alcohol 1.88 proof, United States standard,) the present group of solvents forms a mixture possessing remarkably strong solvent powers and in certain proportions— say, when the alcohol is less in amount than the ketone—the mixture will dissolve pyroxylin much more readily than either the alcohol (practically a non-solvent) or the ketone. Though stronger alcohol can be used, it is not necessary, because a variety of useful effects can be produced by the employment of the ordinary article. This enables me to employ alcohol with the ketones without necessarily weakening their solvent action, and as alcohol, by reason of its volatility and other properties, is a desirable ingredient, especially in the more solid pyroxylin compounds, this reaction is very useful. Of course with the more volatile ketones, which are powerful solvents in themselves, the stimulating action of the alcohol is not so readily observed, and it is especially pronounced when operating with the less volatile ketones.

In some cases, and especially with those ketones of medium volatility which at the same time are less volatile than alcohol, I have found that a mixture of about equal volumes of alcohol and one of these ketones forms a solvent which can be used with pyroxylin for making liquid solutions for spreading on surfaces, though grain-alcohol, as is well understood, is not the best solvent to use in such solutions. Thus a mixture of alcohol and propyl-hexyl ketone with pyroxylin dissolved in it to a syrupy consistency can be spread upon a surface and dried, so as to form a protective coating which when stripped from the surface of glass, for instance, forms a strong beautiful film. When mixed with strong wood-alcohol, these ketones possess a powerful solvent action on the pyroxylin, and they have the power in such mixtures of controlling the action of the wood-alcohol as it evaporates from the compound, so as to prevent the disintegration and formation of weak or cloudy products, which generally result from the employment of wood-alcohol alone as a solvent.

The wood-alcohol combinations give exceedingly fine results when the ketones which lie midway between the extreme members of the series are employed—that is, such ketones as methyl-propyl ketone and diethyl ketone. This applies not only to the more solid compounds made with small proportions of solvents, but also to the more fluid varieties, such as the spreading solutions, combinations of wood-alcohol with diethyl ketone and wood-alcohol with butyron giving exceptionally fine products, the latter mixture, however, drying with moderate slowness.

Camphor, which is so extensively used in pyroxylin compounds, can be employed in connection with these ketones, but I would state that careful investigations show that instead of increasing the solvent power of these ketones, as might generally be supposed when reasoning from analogy, it has a contrary effect and seems actually to retard or weaken the solvent power of these substances, which, I may add, dissolve camphor with great avidity. In some instances, as with methyl-ethyl ketone, the proportion of camphor dissolved is greater in amount than the ketone employed. Camphor does not entirely destroy the solvent powers of these ketones, and its retarding influence on the solvent is more pronounced when it is combined with the less volatile members of the series. I have found, however, that the plastic or moldable property given by the camphor to the compounds made with it more than compensates for the weakening action on the ketone employed and that the simple addition to the mass or solution of other solvents, like alcohol or wood-alcohol, which are calculated to increase the solvent action, is all that is necessary, the beneficial effects of both the camphor and the ketone employed being obtained notwithstanding the necessary use of other solvents.

Since my inventions, as disclosed in the United States Patents Nos. 269,343 and 269,344, were made fusel-oil has been extensively employed in the manufacture of pyroxylin compounds. I can state that it can be used in combination with the present series of solvents and not only imparts its valuable properties to the mixtures, but, further, partakes of the character of alcohol in that it increases the solvent action of these ketones instead of, as might be supposed, weakening them by reason of its non-solvent nature when used alone. It does not, however, stimulate the ketones to the same extent as alcohol and operates in about the same proportions as the alcohol—that is, to obtain strong effects it should be in about equal proportions, or less in amount than the ketone employed, the lesser proportions being the most effective. Its value in these combinations is best seen when a compound containing camphor is to be made. In such cases it more than neutralizes the weakening action on the camphor exerted by these ketones, and when a stiff pasty mass is made the combination of fusel-oil and a weak ketone—like capron, for instance—will form a liquid solvent that when added to the mixture of pyroxylin pulp and camphor has a more powerful action than the capron, which latter, being only slowly active and at the same time weakened by the camphor, can only attack the pyroxylin and camphor with great difficulty. If a very light fusel-oil be used, or one which contains a larger proportion of the lower fusel-oil alcohols—for instance, one which consists largely of propylic alcohol—the stimulating effect of the fusel-oil is more pronounced than when the heavy fusel-oil, or one containing mostly the heavier fusel-oil alcohols, is employed. I may add, as possibly could be inferred from the above description, that not only does the fusel-oil stimulate the power of the ketone, but the ketone also excites the fusel-oil to stronger action. This, in connection with the stimulating action of the alcohol on the ketones, is true with regard to the entire group, but for obvious reasons is most readily indicated when operating with the weaker members. Sulfuric ether, which is often used in the manufacture of pyroxylin compounds, readily mixes with this group of ketones and with a slight stimulating effect, but much less than in the case of alcohol.

The members of this present series of ketone solvents mix readily with either benzin or benzole, and also possess the power to unite wood-alcohol and benzin. My experience in using them indicates that they readily combine with other pyroxylin solvents, so that the operator in the art of manufacturing pyroxylin compounds is thus furnished with a still larger list of solvent substances useful for the various combinations which the demands of this manufacture require.

I may add that where such volatile oils as are employed for pyroxylin solvents are to be used the operator must understand that they resemble camphor in that they do not, so far as I have ascertained, stimulate these ketones to stronger solvent action, and the solvent activity of such mixtures must be regulated either by the selection of proper ingredients or suitable mixtures with other substances, as is understood.

The well-known state of the art and the experience of manufacturers of such compounds as those to which my invention relates render unnecessary any further description or the giving of proportions for the various mixtures. It is sufficient to say that when a solid massive product is required the pyroxylin is preferably to be used in the form of a fine dry pulp, with which a small proportion of the solvent is to be mixed—say, for instance, about equal parts of the solvent and the pyroxylin. This amount of solvent is sufficient to convert the pyroxylin if a thorough mixture be obtained and the mass allowed to rest in an air-tight vessel for several hours and then thoroughly masticated in warm rolls. The subsequent solidifying and manipulation to produce various forms from this compound are well understood.

The solutions possessing a liquid consistency are made, as is well understood, by using sufficient of the solvent to produce the required fluidity with the pyroxylin.

Having described the nature of my invention, the peculiarities of the various members of this group of solvents, and their action in combination with other substances, so that the operator in this art is so thoroughly instructed as to be enabled to intelligently employ them in his mixtures, what I claim, and desire to secure by Letters Patent, is—

1. The art of manufacturing pyroxylin compounds which consists in treating pyroxylin with one or more members of the herein-described group of ketones beginning with methyl-ethyl ketone, substantially as described.

2. A pyroxylin compound consisting of pyroxylin and one or more members of the group of herein-described ketones beginning with methyl-ethyl ketone, substantially as described.

In testimony whereof I affix my signature, in presence of two witnesses, this 10th day of May, 1892.

JOHN H. STEVENS.

In presence of—
  WM. HY. BERRIGAN, Jr.,
  CHARLES FIGARO.